United States Patent [19]

Belforte et al.

[11] Patent Number: 4,543,653

[45] Date of Patent: Sep. 24, 1985

[54] MODULAR SELF-ROUTING PCM SWITCHING NETWORK FOR DISTRIBUTED-CONTROL TELEPHONE EXCHANGE

[75] Inventors: Piero Belforte; Mario Bondonno; Bruno Bostica; Luciano Pilati, all of Turin, Italy

[73] Assignee: CSELT-Centro Studi E Laboratori Telecommunicazioni S.p.A., Turin, Italy

[21] Appl. No.: 506,710

[22] Filed: Jun. 22, 1983

[30] Foreign Application Priority Data

Jun. 22, 1982 [IT] Italy .................................. 67789 A/82

[51] Int. Cl.[4] .......................... H04J 11/04; H04J 3/12
[52] U.S. Cl. .................................... 370/66; 370/110.1
[58] Field of Search .................... 370/58, 63, 59, 110.1

[56] References Cited

U.S. PATENT DOCUMENTS

| | | | |
|---|---|---|---|
| 3,920,914 | 11/1975 | Regnier et al. | 370/63 |
| 3,983,330 | 9/1976 | Tongi | 370/63 |
| 3,991,276 | 11/1976 | Regnier et al. | 370/63 |
| 4,035,584 | 7/1977 | Lurtz | 370/63 |
| 4,142,068 | 2/1979 | Charransol et al. | 370/63 |

OTHER PUBLICATIONS

Proteo System: An Overview by Galimberti et al., International Switching Symposium, Sep. 21-25, 1981, Montreal, Canada.
LSI Components for Digital Line Stages by Melindo et al., Presented at International Switching Symposium, Sep. 21-25, 1981, Montreal, Canada.
The E10.S-TSS.5 A Multipurpose Digital Switching System by Ballard Presented at the International Switching Symposium, Sep. 21-25, 1981, Montreal, Canada.
Time-Division Distributed Switching System by Akiyama et al., Presented at the International Switching Symposium, Sep. 21-25, 1981, Montreal, Canada.

Primary Examiner—Douglas W. Olms
Assistant Examiner—Frank M. Scutch, III
Attorney, Agent, or Firm—Karl F. Ross; Herbert Dubno

[57] ABSTRACT

An automatic exchange of a telephone system comprises a PCM switching network with a plurality of cascaded stages for establishing temporal and spatial connections between incoming channels on input lines of the first stage and outgoing channels on output lines of the last stage in response to commands from external controllers dialoguing with internal controllers of the network. Pairs of switching matrices forming part of nonadjacent stages are combined ito modular switching units each provided with its own internal controller. Routing instructions are transmitted from an external controller to a first internal controller which selects a signal path through the matrices of its own switching unit and informs a second internal controller of that selection whereupon the latter extends the path through an adjoining switching unit, and so on until the connection is completed. Each matrix is provided with a data store which is asynchronously loadable from the associated internal controller with a routing instruction to be synchronously forwarded, in a special time slot dedicated to intercontroller dialoguing in a PCM group to which the instruction pertains, to the data store of a coacting matrix in the next stage for asynchronous retransmission to the controller thereof; each data store may be paired with a respective series/parallel converter coupling it to the associated matrix for serially loading that store in any PCM frame with the contents of the dedicated channels of concurrently arriving PCM groups and feeding stored instruction words in parallel to the output lines of the matrix during a predetermined time slot of each frame. The internal controllers also perform diagnostic operations by comparing bytes extracted from an established signal path at locations upstream and downstream of a matrix.

11 Claims, 7 Drawing Figures

MODULAR SELF-ROUTING PCM SWITCHING NETWORK FOR DISTRIBUTED-CONTROL TELEPHONE EXCHANGE

FIELD OF THE INVENTION

Our present invention relates to a modular structure for a pulse-code-modulation (PCM) switching network of the multistage type forming part of an automatic exchange of a telecommunication (especially telephone) system.

BACKGROUND OF THE INVENTION

A network of this type is the subject matter of commonly owned U.S. patent application Ser. No. 339,101, now U.S. Pat. No. 4,473,900, filed Jan. 13, 1982, by three of us (Piero Belforte, Mario Bondonno and Luciano Piliati) jointly with two others. As particularly described in that application, whose disclosure is incorporated by reference into out present application, the network comprises a set of integrated outer modular units, a set of integrated inner modular units and a set of integrated central modular units, the outer and inner modular units being referred to as "folded" since each of them incorporates two switching matrices pertaining to nonadjacent stages of the network. Thus, each outer modular unit includes a first-stage switching matrix with inputs connected to incoming PCM lines and a last-stage switching matrix with outputs connected to outgoing PCM lines; each inner modular unit includes a second-stage switching matrix with inputs connected to outputs of several first-stage matrices and a penultimate-stage switching matrix with outputs connected to inputs of several last-stage matrices. Each "unfolded" central modular unit includes at least one middle-stage switching matrix whose inputs are linked to outputs of several second-stage matrices and whose outputs are linked to inputs of several penultimate-stage matrices; with a network having an odd number of stages greater than five, at least one other set of "folded" modular units could be used to accommodate additional switching matrices inserted in the input and output connections of the middle-stage matrix. Each modular unit further includes ancillary circuitry connected to its input and output ends for checking the performance of the associated switching matrix or matrices. The operation of the switching matrices is controlled by a multiplicity of base-level microprocessors, one for each modular unit, each of which is responsive to routing instructions from a higher-level controller and is connected not only to the associated switching matrix or matrices but also to the ancillary circuitry of the unit for the detection of operational errors.

As further described in that pending application, the ancillary circuitry of each modular unit comprises an upstream sampler and a downstream sampler for each switching matrix thereof, each upstream sampler having inputs directly connected to those of the associated matrix while each downstream sampler has inputs at least indirectly connected to the outputs of its matrix. The two samplers thus connected across a matrix extract respective bit combinations which are fed, with the necessary relative delay compensating for transit time, to comparison means within the associated microprocessor for the detection of possible disparities therebetween.

In order to facilitate detection of transmission errors not only in the switching matrices themselves but also in their interstage connections, the ancillary circuitry of at least the modular units following those of the first network stage is described as further comprising transceivers connected to the inputs of switching matrices of subsequent stages for feeding back bit combinations, identical with those extracted by the associated upstream sampler, to downstream samplers of preceding stages. More particularly, an output transceiver immediately downstream of each preceding switching matrix and an input transceiver immediately upstream of each subsequent switching matrix are integrated with their associated matrices in the respective modular units. In a modified structure each modular unit includes one or two input/output transceivers interconnected by two-way links to establish signal paths through all the stages of the network, each unit additionally having one or two feedback transceivers interconnected by bidirectional links to establish testing connections independent of the aforementioned signal paths.

The network of this pending application, however, is designed for centralized control by the exchange equipment and not for a distributed-control telephone exchange toward which current technology is evolving. A modular network structure suitable for interfacing with control means distributed on the network periphery is described in U.S. Pat. No. 4,201,890 in the names of Alan J. Lawrence et al. The latter network comprises several stages consisting of multiport switching elements whose 16 ports are integrated components each designed to handle 32 16-bit channels of a single nonstandard bidirectional PCM group. Each switching element is capable of identifying a free output channel through wired logic circuitry at each port. All other routing orders are provided stage by stage by the peripheral control means, using the same channel on which the conversation is to be routed.

The flexibility of utilization of a switching element in this system is limited by the presence of wired-logic routing circuits. Moreover, the routing procedures require the use of 16-bit messages which makes the system incompatible with the standard PCM technology and thus necessitates the use of special components which cannot be used in other parts of the telephone exchange or in combination with standard PCM channels; this requires the provision of interface circuits for signal-format conversion. Incompatibility with standard PCM systems is accentuated by the fact that the same channel subsequently used for speech is first utilized for signaling, making it necessary to complement transmitted messages with information indicating whether it pertains to speech or signaling. As routing control is left largely to the telephone exchange itself, the equipment of that exchange is burdened with the task of commanding the establishment of a connection by each individual switching element stage by stage. Finally, network diagnosis is not decentralized down to the level of the individual switching element and thus devolves entirely upon the supervisory units located at the network periphery.

Another example of a network for distributed-control telephone exchanges is described in a paper titled "Time-division distributed switching system" by Minoru Aliyama et al, presented at the International Switching Symposium of Sept. 22–25, 1981 in Montreal, Canada. This network consists of temporal switching stages controlled by microprocessors and of spatial switching stages with interstage connections implemented by 10-bit parallel PCM groups; it is capable of routing PCM channels autonomously with a step-by-step procedure on the basis of commands from control units distributed on its periphery. Routing orders again use the same channel that is subsequently utilized for speech; thus, the two additional bits serve to indicate whether the message pertains to signaling or speech. This type of structure requires two different kinds of switching elements for time and space switching; any expansion demands that interstage links be rearranged through a different configuration of spatial stages. The temporal switching element does not operate on standard serial PCM groups; here, too, interface circuits must convert such standard PCM groups—arriving from subscribers and from trunks—to the format required within the switching network. The use of 10-bit parallel PCM groups makes the connections between network swtiching elements cumbersome; switching capacity in terms of PCM channels handled by the basic module is limited. Also, as in the system of Lawrence et al, circuit diagnosis is not decentralized down to the individual basic-module level and thus devolves entirely upon the peripheral supervisory units.

OBJECTS OF THE INVENTION

The general object of our present invention is to provide an improved switching network of the type described in commonly owned application Ser. No. 339,101 which allows for the distributed control of its constituent matrices to establish and disestabish respective segments of a signal path between a selected input line and a selected output line of the network adapted to carry data words pertaining to groups of incoming and outgoing PCM channels, all with a high degree of flexibility and avoidance of the inconveniences referred to above.

A more particular object is to provide a network of this descritpion which can be controlled by commercially available microprocessors and whose constituents can be realized by large-scale-integration (LSI) technology.

It is also an object of our invention to provide such a network with reliable diagnostic means able to verify the continuity of an established signal path over its entire length within the network.

SUMMARY OF THE INVENTION

A PCM switching network according to our invention, having cascaded stages with matrices adapted to connect any input line to any output line thereof, is provided with internal control means responsive to commands from external control means of the exchange for setting up and releasing temporal and spatial signal paths between selected input and output lines, the internal control means including a plurality of local or network controllers associated with respective matrices and arranged to communicate with one another and with the external control means by routing instructions transmitted in dedicated channels of PCM channel groups entering these matrices.

This intecommunication of network controllers, utilizing a specially selected PCM channel, eliminates the need for detailed routing instructions sent to each of these controllers by centralized external control means of the exchange, as is the case in the system of the above-identified pending application by Belforte et al where these network controllers are at the lowest level of a 3-tier hierarchy.

The controller associated with a first-stage matrix receives initial routing instructions from the extenal control means via the dedicated channels of the several groups entering that matrix by the input lines of the network. These initial instructions, identifying only the entrance and exit points of any signal path to be set up or released, are progressively modified by each intervening network controller on being passed from one stage to the next, the modification informing the receiving controller of the point of entry (in terms of time and location) of the respective channel into the matrix associated with the latter controller which thereupon establishes the following path segment. It is therefore desirable, pursuant to another feature of our invention, to associate each matrix with a respective data store which may be considered part of the internal control means and which communicates asynchronously with the respective network controller but synchronously, i.e. at a frequency related to that of the time slots of a PCM frame assigned to respective channels, with the associated matrix. Each data store preferably receives data words of several incoming routing instructions—pertaining to different PCM channels of a group—in serialized form in the course of the recurrent PCM frame within which these data words appear in one predetermined time slot assigned to the dedicated channels of the several groups; by the same token, the data words of outgoing routing instructions are emitted in the predetermined time slot from the data store to respective matrix outputs carrying channel groups to which these outgoing instructions pertain. The serialization and the parallelization of these incoming and outgoing data words are carried out, advantageously, with the aid of a converter interposed between the store and the matrix, under the control of timing means responsive to synchronization pulses accompanying the recurrent PCM frame.

Instead of a converter, a circuit including a nonswitchable input/output pair of the matrix may be used for the loading and unloading of the associated data store.

A network pursuant to our invention may also be provided, in a manner known per se from the above-identified Belforte et al application, with a pair of samplers connected to signal lines at locations upstream and downstream of each matrix for extracting data words entering and leaving the respective matrix in an established signal path at instants separated by the transit time between these locations so that, if the signal path is continuous between the locations referred to, the extracted data words will be identical as determined by a comparator in the associated network controller. This controller, accordingly, will be able to verify such continuity.

BRIEF DESCRIPTION OF THE DRAWING

The above and other features of our invention will now be described in detail with reference to the accompanying drawing in which.

SPECIFIC DESCRIPTION

Figure 1:
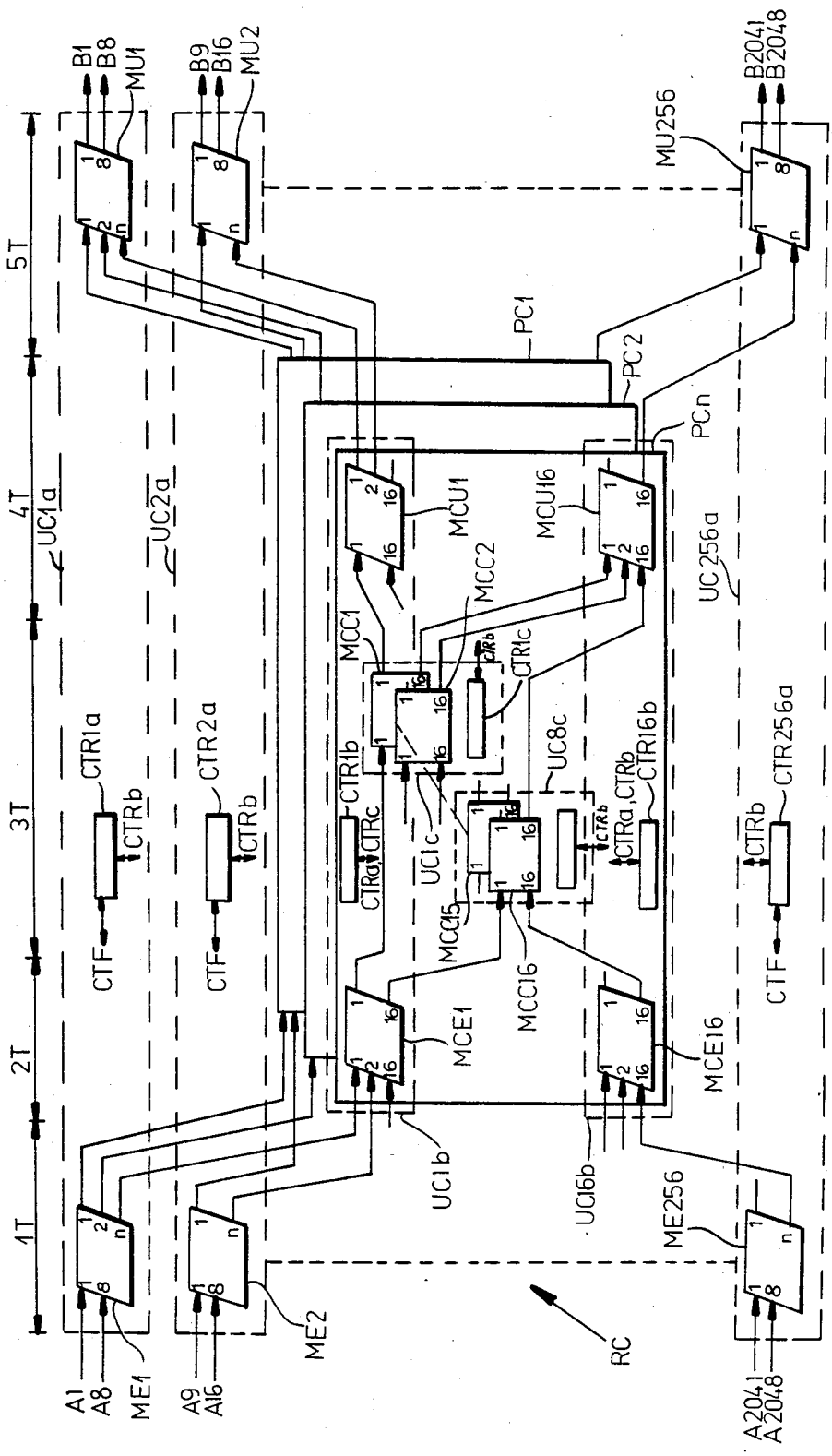
FIG. 1 is an overall block diagram of a PCM switching network embodying the invention.

In FIG. 1 we have shown a switching network RC according to our invention with five time-division (TDM) stages 1T, 2T, 3T, 4T, 5T pertaining to a transit exchange with 2048 incoming PCM links A1 ... A8, A9 ... A16, ... A2041 ... A2048, and 2048 outgoing PCM links B1 ... B8, B9 ... B16 ... B2041 ... B2048, each designed to carry a standard PCM group with 32 8-bit channels.

The layout of FIG. 1 is virtually identical with that shown in FIG. 1 of the commonly owned Belforte et al application Ser. No. 339,101, except for the controllers associated with the network.

The first stage 1T consists of 256 rectangular PCM switching matrices ME1 ... ME256, each having 8 inputs connected to as many incoming lines and k outputs ($8 \leq k \leq 16$) extending toward the second stage 2T.

The three intermediate stages 2T–4T are organized in k switching planes PC1, PC2 ... PCk each including 16 square matrices capable of handling 16 incoming/outgoing groups. FIG. 1 shows only plane PCk in detail; the matrices of stage 2T are designated MCE1 ... MCE16, those of stage 3T are labeled MCC1 ... MCC16, and those of stage 4T bear references MCU1 ... MCU16. In these and other designations, letters "E" and "U" stand for "input" (Italian: "Entrata") and "output" (Italian: "Uscita"), respectively, whereas "C" denotes "central".

The fifth stage 5T consists of 256 rectangular matrices MU1 ... MU256, identical with matrices ME1 ... ME256 but capable of handling k input groups and 8 output groups. The first-, second-, third-, fourth- and fifth-stage matrices will be collectively referred to as ME, MCE, MCC, MCU and MU, respectively.

Figure 3:
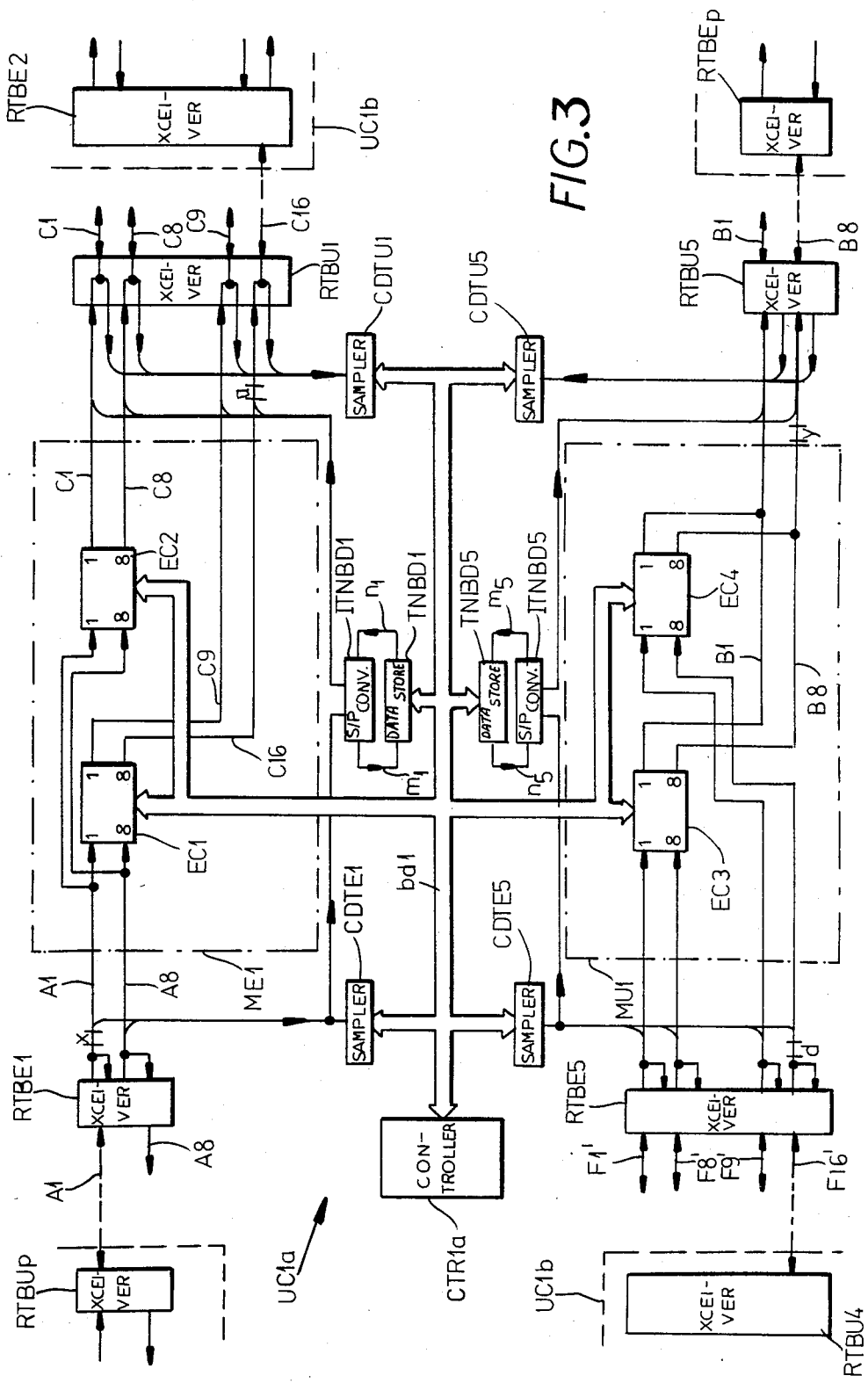
FIGS. 3, 4 and 5 are more detailed block diagrams of various switching units used in the network of FIG. 1.
Figure 4:
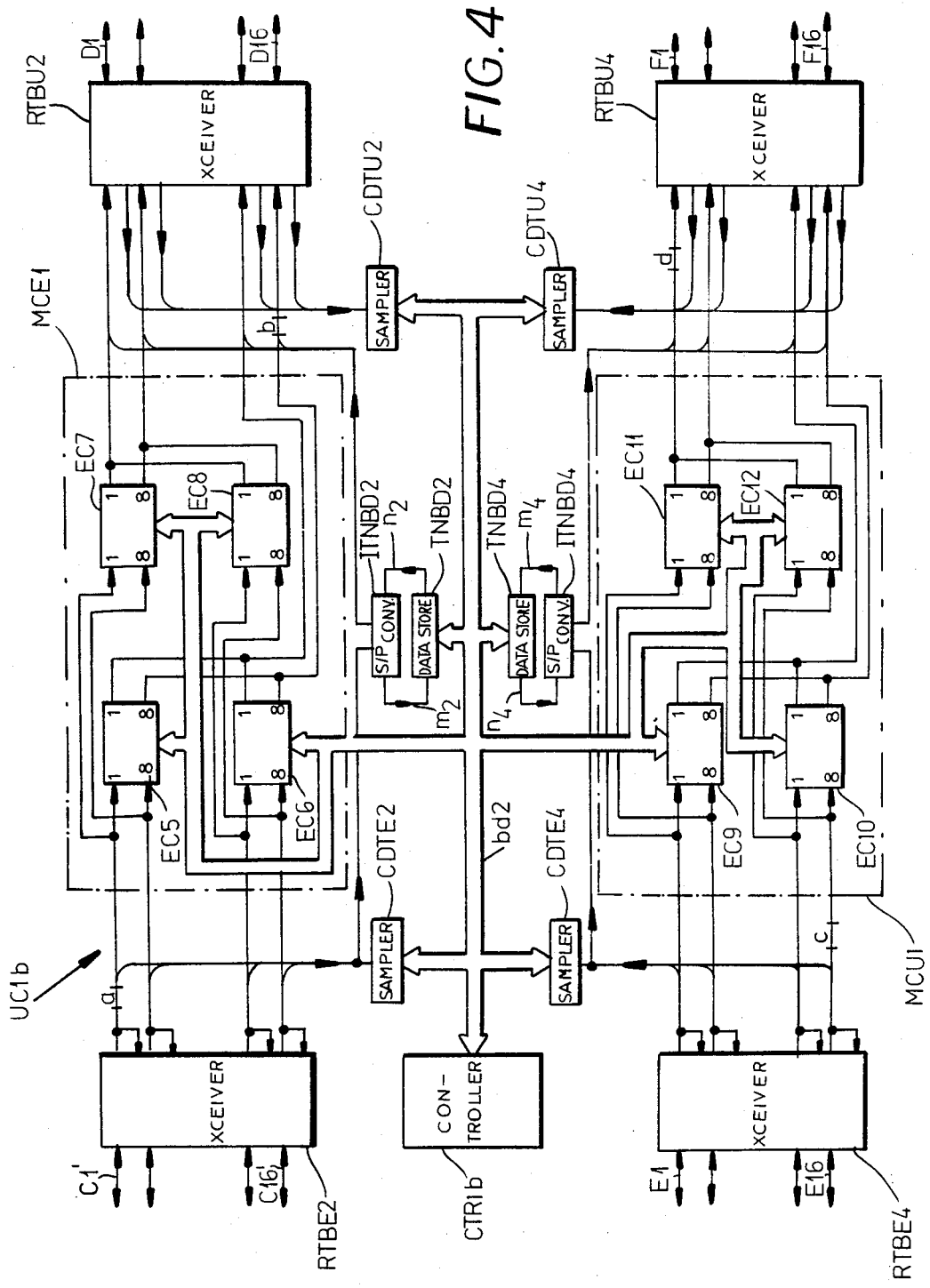
Figure 5:
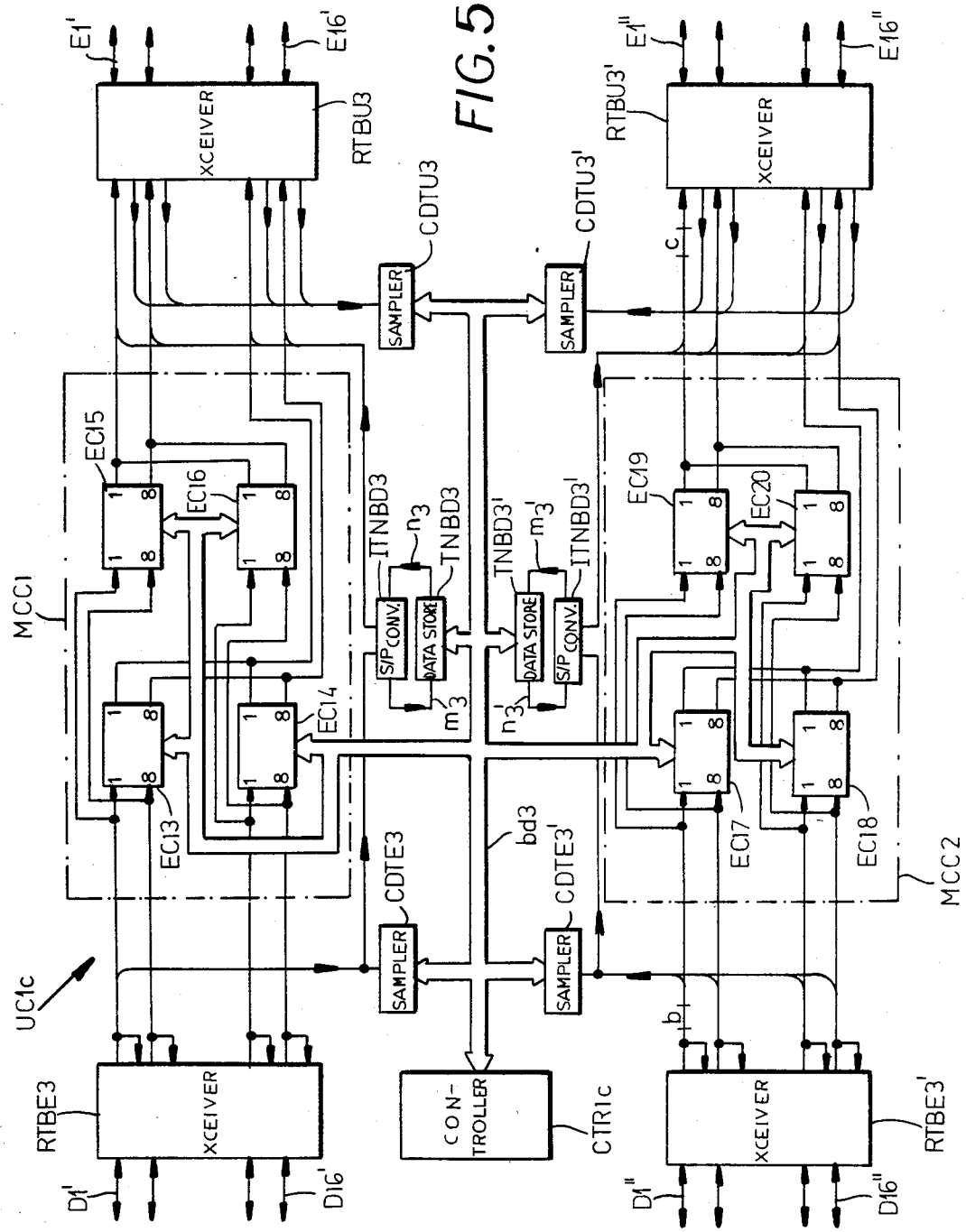

These matrices all start from a single switching element with 8 input groups and 8 output groups as described in commonly owned U.S. Pat. No. 4,386,425 also in the names of Belforte et al. Connections between individual elements, combining them into $8 \times k$ and $16 \times 16$ matrices, are shown in FIGS. 3 through 5 of that patent.

The first-stage matrices ME and the second-stage matrices MCE are so interconnected that all No. 1 lines originating at the 256 matrices ME are connected in sequence to the 256 inputs of central plane PC1, all No. 2 lines are connected to the 256 inputs of central plane PC2, and so on up to the No. k lines which are connected to the inputs of plane PCk. The connections between the output of planes PC1 ... PCk and the inputs of matrices MU1 ... MU256 are a mirror image of the connections between matrices ME and the inputs of planes PC1 ... PCk.

Matrices MCE, MCC and MCU are interconnected within each plane. More particularly, the No. 1 output lines of the 16 matrices MCE1 ... MCE16 are connected in sequence to the 16 inputs of matrix MCC1, the No. 2 output lines of the same matrices MCE1 ... MCE16 are connected in sequence to the 16 inputs of matrix MCC2, and so on up to the No. 16 output lines which are connected to the 16 inputs of matrix MCC16. The connections between matrices MCC and MCU are a mirror image of those between matrices MCE and MCC.

As further shown in FIG. 1, the position of central stage 3T consisting of matrices MCC is symmetrical relatively to the rest of the network.

Areas UC1a ... UC256a, UC1b ... UC16b, UC1c ... UC8c enclosed by dashed lines indicate groupings of basic matrices associated with respective internal or network controllers CTR1a ... CTR256a, CTR1b ... CTR16b and CTR1c ... CTR8c. These groupings correspond to effective structural modules of the network, referred to hereinafter as switching units. The modules are realized by a single type of printed-circuit board and use components of identical character though they may differ from one another by the positioning of their constituents and may also have controllers with different software.

In particular, modular units UC1a ... UC256a each include a first-stage matrix ME and a fifth-stage matrix MU; units UC1b ... UC16b each include a second-stage matrix MCE and a fourth-stage matrix MCU whereas units UC1c ... UC8c each contain two matrices MCC. For the sake of brevity, we shall collectively refer to units UC1a–UC256a, US1b–UC16b and UC1c–UC8c as UCa, UCb and UCc, respectively.

With this arrangement, the network of FIG. 1 may be given a folded structure. Thus, the same modular unit will have available both an incoming and a corresponding outgoing line multiple, serving respective PCM groups, which are both subject to governing and diagnostic functions by the same controller CTR.

Moreover, the constructive folding of modular switching units UCa and UCb makes it possible to distribute the switching capacity of units UCa over two blocks of 256 channels used respectively in the first and the fifth stage, and to distribute the capacity of units UCb over two blocks of 512 channels used in the second and the fourth stage. This has the advantage of enabling a modular growth in overall network capacity in steps of 256 PCM channels on the periphery, rather than of 512 channels as would be the case with the use of an individual switching unit in unfolded form, i.e. a unit incorporating two matrices of the same stage. Thus, in the event of failure of any one such modular unit, the number of links remaining out of service can be limited to 256.

Such modular growth is achievable by progressively increasing the number of outer modular units UCa and by increasing the number of folded inner units UCb within each switching plane PC. Consequently, each increase by 16 outer units UCa corresponds to an increase by one inner unit UCb in each of the k switching planes PC.

The type of interstage connection described makes the network completely accessible.

The possibility of varying the number of central planes up to a maximum of 16 enables minimization of blocking probability in the network.

From the point of view of reliability, and aside from the above-mentioned modularity of peripheral degradation, the central stages 2T–4T respond to failure with a very limited impairment of traffic since any failure affects a maximum of 1024 interstage channels.

A generic controller CTR has the tasks of dialoguing with the controllers of adjacent switching units, executing routing orders (connection, disconnection, blocking), verifying established connections, diagnosing itself, generating and handling alarm messages, and determining an existing identification of network configuration (recognition of inter-unit connections).

The controllers of the various switching units are interconnected in a manner analogous to that of the matrices. In particular, for dialoguing with other controllers of the network or with the control units of the exchange (cf. FIG. 2) for purposes of network management, a controller has available a number of physically separate bidirectional communication channels which is equal to the number of PCM groups handled by the corresponding modular switching unit UC. All controllers are designed as microprocessors.

Thus, for instance, a predetermined 64-kbit/s channel chosen from among the 32 channels forming a given PCM interstage link can be used as a dialogue channel. Advantageously such dedicated channel carries only the messages relating to the channels of that group.

The presence of such a special channel, which is permanently dedicated to the dialogue among the controllers and which is separated from speech channels, obviates the need for bits serving to distinguish between signaling and speech messages; thus, the network according to our invention can handle standard PCM channels. The allocation of a dialogue channel to each PCM group meets those reliability requirements that call for a distribution of the signaling paths.

Double-headed arrows CTRa, CTRb, CTRc, CTF show connections of the controllers to one another and to the control equipment of the exchange. These connections also appear in FIG. 2 which shows the network RC of FIG. 1 in symbolic and folded form, as well as its insertion in a distributed-control telephone exchange; peripheral units UL1 . . . ULh . . . UL2048 of this exchange are connected to trunks or to subscribers. These peripheral units are allocated singly (UL1) or in groups to control units CTFa, CTFb; in the more general case the network is also connected to other control units CTFc which can perform functions of a higher hierarchical level than those of units CTFa and CTFb, or functions relating to dialogue between these units as well as possible auxiliary functions. Units CTFa, CTFb and CTFc together constitute the external control means of the telephone exchange. These units communicate with one another through speech channels derived from PCM connections extending toward the network (single-line arrows) and with the network controllers through the dedicated PCM channel of each group passing to the network (double-line arrows). Also within network RC, single-line arrows indicate speech connections and double-line arrows indicate channels for dialogue between controllers.

Figure 2:
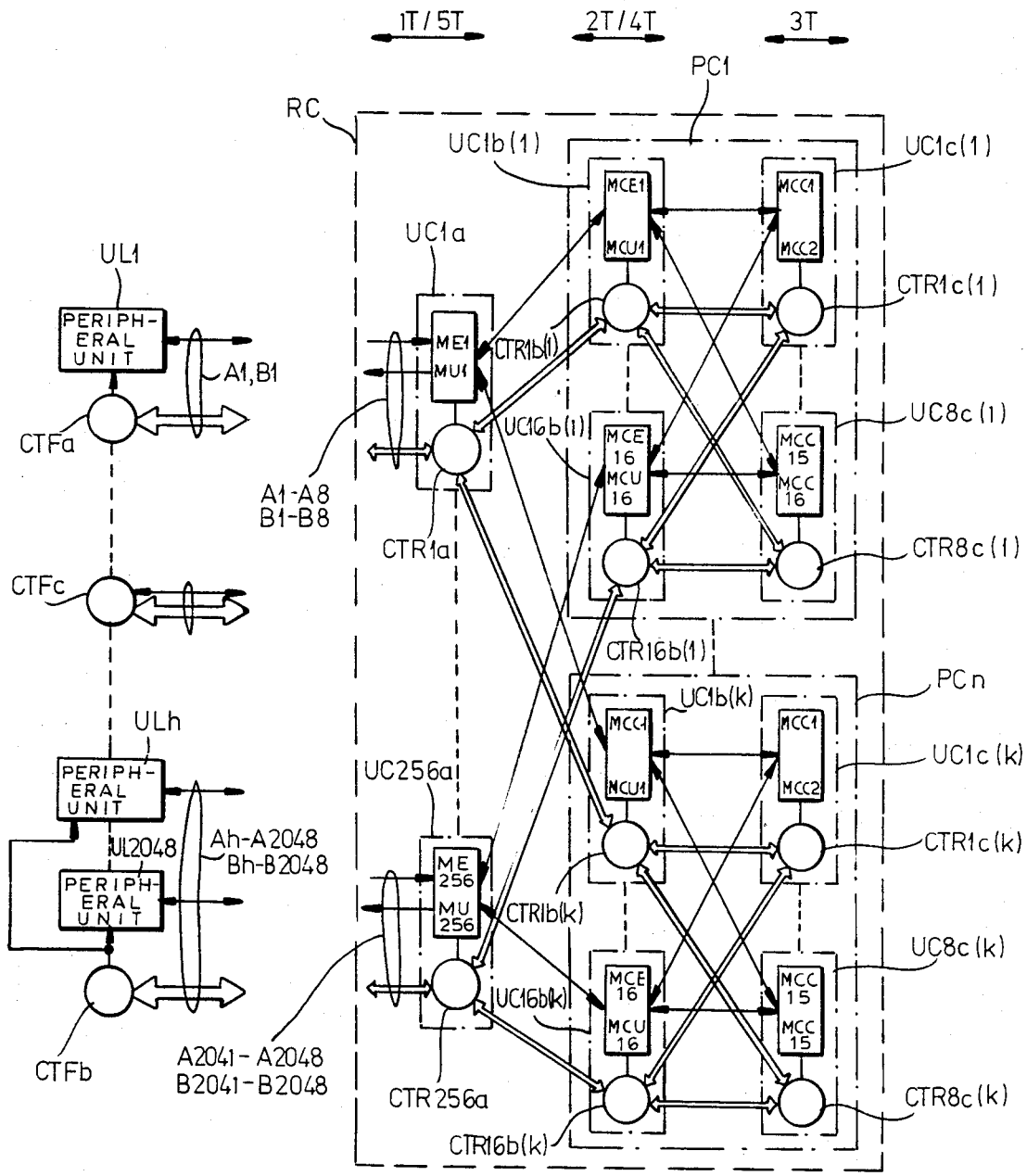
FIG. 2 illustrates the PCM switching network of FIG. 1, in folded form, and its connections with peripheral control units of an associated telephone exchange.

In FIG. 2 the elements described with reference to FIG. 1 have been indicated with the same symbols; parenthetical postscripts identifying their planes have been added for units UCb, UCc and their respective controllers. Connections between matrices are shown separately from those between controllers, even though in reality they are merely different channels of the same groups.

FIG. 3 shows switching unit UC1a in detail. By way of example it is here supposed that matrices ME1 and MU1 respectively perform an expansion from 8 incoming lines to 16 and a concentration from 16 outgoing lines to 8. To this end, the matrices each consist of two switching elements or arrays EC1, EC2 and EC3, EC4, respectively, the first two of which have inputs connected in parallel to lines carrying groups A1 . . . A8 while the other two have outputs connected in parallel to lines carrying groups B1 . . . B8. The four switching elements EC1 . . . EC4 are connected to controller CTR1a through a bidirectional data bus bd1. At C1 . . . C16 we have indicated the 16 PCM groups emitted by matrix ME1 toward the second stage, and at F1' . . . F16' we have indicated the PCM groups reaching matrix MU1 from the fourth stage.

In addition to the switching matrices and the controller, the switching unit also includes anxillary diagnostic circuits or analyzers CDTE1, CDTU1 . . . CDTE5, CDTU5 and RTBE1, RTBu1 . . . RTBE5, RTBU5, and coupling circuits TNBD1, ITNBD1 . . . TNBD5, ITNBD5 for dialoguing with the controllers of units UCb (FIG. 1) and with the distributed external controllers CTFa, CTFb, CTFc (FIG. 2). Postscripts 1 and 5 indicate circiuts belonging to the first and fifth network stages, respectively. These components are all integrated circuits, enabling any generic unit UC to be accommodated on a single printed-circuit board. Circuits CDT are samplers having the task of extracting a bit octet or byte relating to a channel of one of the incoming or outgoing PCM groups entering or leaving the matrices ME1, MU1; the extraction occurs at an instant established by the controller. Circuits CDT then store the byte and supply it to the controller through data bus bd1.

The structure of data extractors CDT conforms to that of commonly owned U.S. patent application Ser. No. 235,947 filed Feb. 19, 1981 by Piero Belforte and Renzo Bortignon, now patent No.

Circuits RTBE and RTBU are full-duplex transceivers, used here to ascertain the continuity of a signal path by feeding back an arriving signal at a downstream location of a line to an analogous transceiver placed at an upstream location for comparison with the original signal (echo check) without requiring further interstage connections. Transceivers RTBU1, RTBE5 and RTBE1, RTBU5 of unit UC1a respectively coact with remote transceivers RTBE2 and RTBU4 at the second-stage inputs and at the fourth-stage outputs of the several units UCb and with peripheral transceivers RTBUp, RTBEp located outside network RC, i.e. ahead of stage 1T and beyond stage 5T, respectively.

The structure of circuits RTBE, RTBU is described in commonly owned U.S. Pat. No. 4,393,494 in the names of Piero Belforte and Renzo Bortignon.

Circuits TNBD1 and TNBD5 are storage devices enabling the asynchronously operating controllers to dialogue through a synchronous transmission path such as a PCM link. Their structure is described in commonly owned U.S. Pat. No. 4,345,325 in the names of Marco Gandini and Ernesto Viale.

In the present instance, circuits TNBD1, TNBD5 and their counterparts provided in switching units UCb and UCc of planes PC1 . . . PCn are capable of transmitting and receiving up to a maximum of 16 8-bit words or bytes. These 16 bytes are part of 16 messages consisting of 7 bytes each; the first byte is a function code which indicates the presence of a message and its character (e.g. a routing instruction), the five subsequent bytes represent the information content and the last byte is a check word (e.g. one representing the binary sum of the six preceding bytes). Transmission or reception of a complete message will thus occupy 7 frames. Circuits TNBD1 and TNBD5 are connected to controller CTR1a through the data bus, and to circuits ITNBD1 and ITNBD5 through connections $m_1$, $n_1$ and $m_5$, $n_5$ designed to convey a 32-channel PCM group.

Circuits ITNBD1 and ITNBD5 carry out serial/parallel and parallel/serial conversion as well as the following tasks:

(a) extracting the contents of the special channel, dedicated to dialogue among controllers, from each of the PCM links respectively entering the matrices ME1 and MU1 and inserting these contents in as many PCM channels (specifically even-numbered ones) of the serial flow on leads $m_1$, $m_5$; and (b) transferring the contents of the even-numbered channels of a serial input group, present on connections $n_1$ and $n_5$, to the special channel of PCM links leaving the matrices ME1, MU1.

The order number of the channel from which contents are to be extracted and in which information will be inserted is determined by the phase relationship between the 8-kHz sync pulse of an arriving PCM frame and the frame timing of the PCM network of which the circuit forms part. The structure of circuits ITNBD will be described below with reference to FIG. 6.

FIGS. 4 and 5 show the structure of modular units UC1$b$, UC1$c$, which is perfectly analogous to that of unit UC1$a$ except for a difference in the number of switching elements EC that constitute their matrices. Thus, each of these matrices contains four (instead of two) switching elements, with inputs and/or outputs connected in parallel, so that the matrices switch 16 PCM groups as described in the aforementioned U.S. Pat. No. 4,386,425. These elements are designated EC-5–EC12 in FIG. 4 and EC13–EC20 in FIG. 5. Moreover, we have indicated the input/output groups of matrix MCE1 by C1' ... C16', D1 ... D16 (FIG. 4), those of matrix MCU1 by E1 ... E16, F1 ... F16, those of matrix MCC1 by D1' ... D16', E1' ... E16' (FIG. 5), and those of matrix MCC2 by D1'' ... D16'', E1'' ... E16''. Here, also, circuits RTBE, RTBU, CDTE, CDTU, TNBD, ITNBD and leads m, n, included in different switching units, are given suffixes identifying the stage to which they belong. Suffixes 3 and 3' have been used for the third stage.

The numerical capacity regarding PCM channels handled by individual switching units has been so chosen as to make it possible for current technology to realize each switching unit as a single replaceable structural element (printed-circuit board). This numerical value has been determined on the basis of the characteristics of the switching matrices adopted (ME, MCE, MCC, MCU, MU), of the coupling circuits (ITNBD, TNBD) facilitating dialogue among the controllers CTR, of the ancillary circuits for diagnostic purposes (CDT, RTB) and of the commercially available microprocessors (CTR) and associated peripheral circuits; printed-circuit boards should also conform to established norms, e.g. the DIN standard "Double Europe" format.

It should be noted that the organization of switching matrices ME1, MU1, MCE1, MCU1, MCC1 and MCC2 given by way of example in FIGS. 3, 4 and 5 makes it possible to use components of even greater capacity (double, for example), should such matrices become available on the market, with the structure of the entire network of FIG. 1 remaining unchanged.

The three kinds of switching units illustrated in FIGS. 2–4 correspond to three physically different modes of utilization of the same type of printed-circuit board.

Our extensive use of network structures incorporating replaceable modular elements of the same type with only a limited number of components of different types, as disclosed here, affords considerable advantages in terms of production, stocks and maintenance.

The paired circuits ITNBD and TNBD considerably reduce the load on the associated microprocessor controller by taking over the repetitive portion of the dialogue consisting in the storage and formation of the entire message. The use of standard components for serial dialogue would oblige the controllers to follow part of the dialogue, thus diminishing their ability to perform other functions.

The same pair of circuits TNBD and ITNBD can be advantageously used in combination with the external control unit CTFb (FIG. 2) to insert and extract dialogue messages relating to the operation of the network. Only circuit TNBD is necessary for units CTFa, CTFc each serving but a single channel.

Thanks to the use of these and the other ancillary circuits, the control network can satisfactorily handle a large flow of routing orders, making it possible to use the network also for auxiliary functions such as dialogue between the control units arrayed on its periphery.

In this way, the external control units can be interconnected at any time on the basis of a specific routing instruction sent to the network, thus avoiding the need for permanent connections within the network which would limit its capacity.

Figure 6:
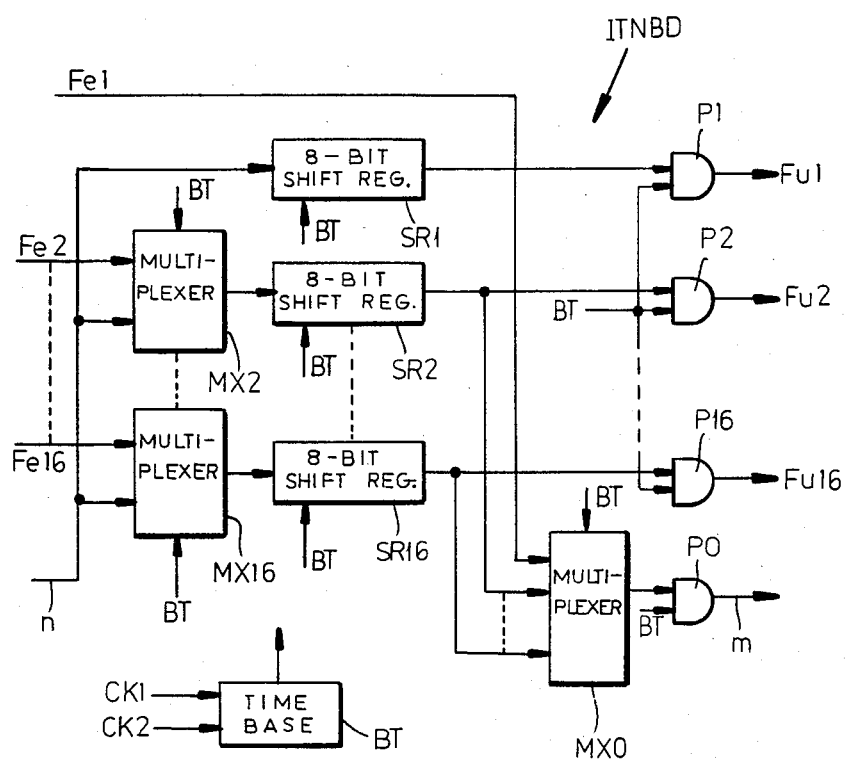
FIG. 6 is a block diagram of circuitry used for dialogue between controllers of the network.

FIG. 6 shows a preferred embodiment of a converter circuit ITNBD, with 16 incoming and outgoing PCM groups; the No. 0 channel of each PCM group is the one dedicated to intercontroller dialogue. Modifications required for application to a number of groups other than 16, as could be necessary for use in controller CTFb (FIG. 2), will be readily apparent. Incoming and outgoing groups are carried by lines Fe1 ... Fe16, Fu1 ... Fu16 whereas connections m, n (leading to and from the associated data stores) are representative of leads $m_1$ ... $m_5$, $n_1$ ... $n_5$ of FIGS. 3-5. The circuit consists of 16 8-bit shift registers SR1, SR2 ... SR16; the inputs of registers SR2 ... SR16 are connectable to incoming lines Fe2 ... Fe16 through 2-input multiplexers MX2 ... MX16 each having a second input connected to lead n; the outputs of the same registers are connected to outgoing lines Fu1 ... Fu16 through AND gates P1 ... P16 and in parallel therewith to as many inputs of a multiplexer MX0, which has a sixteenth input connected to line Fe1 and an output connected through an AND gate P0 to lead m.

Register SR1 has an input connected to lead n and an output connected through AND gate P1 to line Fu1.

A time base BT derives control signals for the switching of multiplexers MX0, MX2 ... MX16 and for the stepping of shift registers SR1 ... SR16, as well as enabling signals for the same registers and for gates P0 ... P16, from a bit-synchronism signal CK1 at 2048 MHz and a frame-synchronism signal CK2 at 8 kHz. In particular, in the time slot allotted to channel No. 0 multiplexer MX0 connects output lead m to its input tied to line Fe1, multiplexers MX2 ... MX16 connect the inputs of their associated registers to lines Fe2 ... Fe16, the registers are all enabled for shifting, and gates P0 ... P16 are unblocked.

Throughout the remainder of the frame, multiplexers MX2 ... MX16 connect registers SR2 ... SR16 to lead n and gates P1 ... P16 are blocked. Furthermore, in even-numbered time slots (Nos. 2, 4 ... 30) registers SR2 ... SR16 are consecutively enabled, multiplexer MX0 successively connects the outputs of these registers to its own output and gate P0 is again unblocked to transfer their contents to lead m.

At time slot No. 0 of each frame, accordingly, the bits of the No. 0 channel of the group arriving on line Fe1 pass to lead m, the bits of the No. 0 channels of the groups arriving on leads Fe2 ... Fe16 are loaded into registers SR2 ... SR16, and the bits of the No. 0 channel of the PCM flow on lead n are loaded into register SR1. Simultaneously, the previous contents of registers SR1 ... SR16, loaded respectively in the even-numbered time slots Nos. 0, 2, 4 ... 30 of the preceding frame, are emitted on lines Fu1 ... Fu16.

In time slots Nos. 2, 4 ... 30 of the new frame, registers SR2 ... SR16 respectively receive the contents of the channels of the PCM flow on lead n, and the byte loaded in the No. 0 time slot of the same frame is emitted on lead m through multiplexer MX0. Thus, the bytes of the No. 0 channels arriving in parallel over lines Fe1–Fe16 are fed in series on lead m to the associated data store TNBD (FIGS. 3–5) and, after being serially read out therefrom on lead n, are sent out in parallel over lines Fu1–Fu16.

Lines Fe1–Fe16 and Fu1–Fu16 are branched off the inputs and outputs of the associated matrix as will be apparent from FIGS. 3–5.

We shall now describe the operation of the control network RC for diagnosis and routing.

A routing instruction emitted by the control equipment of the exchange will contain in its function code the information that a connection is to be made; the five subsequent words identify incoming and outgoing channels of the network as well as the outgoing group. Since the dialogue is of the associative type, the indentity of the incoming group is always unequivocally determined by the identity of the dedicated channel.

It will be supposed by way of example that the incoming channel is channel x of group A1 (FIG. 3) and that the outgoing channel is channel y of group B8. The message will thus be emitted by controller CTFa (FIG. 2) on the dedicated No. 0 channel of group A1.

Through transceivers RTBUp and RTBE1 (FIG. 3), the first word of this message reaches converter ITNBD1 which inserts it in an available channel of the PCM flow transmitted on lead m₁ to circuit TNBD1. The latter recognizes that the message has arrived, through the procedures described in the aforementioned U.S. Pat. No. 4,345,325, and stores the byte present on the channel. The same operation is repeated for the six subsequent frames. After receiving the seven bytes, circuit TNBD1 generates an INTERRUPT signal which is used by the local controller CTR1a to transfer the message from the memory of circuit TNBD1 to its own data store through bus bd1.

Internal controller CTR1a checks whether the message is correct by using the last byte thereof. If verification fails, the controller does not take the steps necessary to set up the connection but can start a diagnostic procedure, sending a message alarm signal to the exchange equipment via the connection linking same with the fifth network stage ST.

The same checks on the correctness of the message are carried out in the following stages, possible alarm messages being forwarded in each instance to the controller of the adjoining upstream stage.

If the message is correct, circuit CTR1a locates a signal path between the first and second network stages 1I , 2T on the basis of the free or busy state of the interstage links; known algorithms may be used to minimize transit delay. Once a free signal path has been found, the controller forwards the routing instruction to matrix ME1 through bus bd1.

Let us assume that the instruction concerns the elemental array EC1 and causes a switching of channel x of group A1 (input No. 1 of that array) to channel a of group C16 (output No. 8 of array EC1) connected to input No. 1 of matrix MCE1 which is part of switching unit UC1b (FIG. 1) of plane PCk, with k=16. A routing through unit EC1 having been selected, the parallel-connected input No. 1 of array EC2 paired therewith is disabled.

When the switching has been carried out, and possibly after a checking of the continuity—by diagnostic procedures described hereinafter—of the physical path chosen toward the second stage 2T, controller CTR1a modifies the received routing instruction by replacing the identity of the input channel with that of the output channel of the first stage 1T. The rest of the information content of the routing message (network output channel and group) remains unchanged.

The modified instruction is sent to circuit TNBD1 through data bus bd1; circuit TNBD1 stores this instruction, inserts it in an available channel of the PCM flow transmitted on lead n₁, and forwards it to converter ITNBD1 which in turn transfers it to the dedicated No. 0 channel of group C16 for seven consecutive frames.

Through components RTBU1, RTBE2, ITNBD2, TNBD2 and bd2 (FIG. 4) the new message reaches controller CTR1b (FIG. 4) which, from the identity of the dialogue channel, recognizes a routing instruction concerning the second stage 2T and, in particular, channel a group C1'. Circuit CTR1b locates a free channel among the 512 outputs of matrix MCE1, using the same procedure as controller CTR1a.

We shall assume by way of example that the choice concerns channel b of group D16, which is connected to input No. 1 of matrix MCC16 of unit UC8c (FIG. 1); this incoming group corresponds to group D1" of FIG. 5. Controller CTR1b (FIG. 4) selects in matrix MCE1 the elemental array which is to carry out the connection, in this case element EC5; the connection involves the No. 8 input and output of that array so that the controller must disable channel b of output No. 8 of array EC6 whose outputs are connected in parallel with those of array EC5. After a verification that switching has been carried out, the pertinent data are stored in controller CTR1b which forwards the new message to circuit CTR8c (FIG. 1) through bus bd2, circuits TNBD2, ITNBD2, RTBU2 and devices corresponding to components RTBE3', ITNBD3', TNBD3' and bd3 (FIG. 5).

With the network organization described, routing (as far as the PCM group is concerned) is unequivocal from this point on: to reach output group B8 (FIG. 1), it is necessary to access matrix MU1 which can be reached from matrix MCC16 only through the No. 1 output of the same matrix (corresponding to group E1", FIG. 5, and connected to input No. E16 of matrix MCU1) and the No. 1 output of matrix MCU1 (group F1, FIG. 4). Consequently, once the input channel to which the message refers is recognized, controller CTR8c can only select a channel within the first group (channel c, for example), establish the connection, and prepare the new message for controller CTR1b (FIG. 1). The latter recognizes a routing instruction for the fourth stage 4T and selects a channel (channel d, for example) in an output group F1, which corresponds to group F16' (FIG. 3) at the input of matrix MU1. After completing the connection between channel c of group E16 and channel d of group F1 through array EC12, controller CTR1b forwards the new message to circuit CTR1a which in turn lets matrix MU1 connect channel d of incoming group F16' to channel y of outgoing group B8. This connection involves the No. 8 input and output of array EC4.

At this point the desired connection within network RC is set up; a confirmatory message may be routed by controller CTR1a to the external control unit to which the line carrying group B8 is connected.

Disconnections are carried out in accordance with the same procedures as have been described for connection. The relevant message is emitted by the external control unit (e.g. controller CTFa, FIG. 2) which has emitted the routing instruction and contains in its data field an identification of the incoming channel relating to the path to be released (here channel x of group A1). The message is received by controller CTR1a of unit UC1a (FIG. 3), which looks in its data store for the output channel and group associated with the input channel and group identified by that message. In this case the output channel is channel a and the group is No. 16. Controller CTR1a carries out disconnection in matrix ME1, verifies this disconnection with the aid of extractor CDTU1, modifies the data field of the message by replacing the indentification of channel x with that of channel a, and transmits the disconnection message toward second-stage controller CTR1b on the dedicated dialogue channel of output group No. 16. The procedure is then repeated in an analogous manner up to the fift-stage controller CTR1a, which can inform the peripheral unit connected thereto that the signal path has been released.

Through circuits RTBE, RTBU, CDTE, CDTU the controller of each individual state can verify the establishment of any connection toward the immediately following stage. As particularly illustrated in FIG. 2 for the downstream transceiver RTBU1 associated with matrix ME1, outgoing data words are fed back to a sampler such as CDTU1 from junction points inside the corresponding downstream transceiver. The diagnosis is carried out by extracting a byte of the involved input channel through circuit CDTE and by comparing such byte with a corresponding byte extracted by sampler CDTU from the output channel of the same stage, making allowance for delay (in terms of number of frames) due to transit through the matrix between the locations at which the bytes are extracted. The second byte is sent by the upstream transceiver RTBE of the subsequent stage, through the downstream transceiver RTBU of the stage in which the diagnosis is carried out, to the corresponding sampler CDTU of the latter stage. In this way, the diagnosis encompasses not only the matrix used in this stage but also the connection between the matrix and another matrix belonging to a subsequent stage.

The application of this procedure to all the network stages establishes continuity among the diagnosis of the participating switching units in the entire signal path between the input and the output of network RC, thus insuring that every part of that path is subjected to verification.

As concerns the diagnosis carried out in the second stage 2T on the connection described by way of example, internal controller CTR1b calculates the transit delay, sends byte-extraction commands to samplers CDTE2 and CDTU2 and finally compares the relatively delayed bytes with each other. If the comparison result is positive, the controller modifies the data field of the routing message received by replacing the identification of the input channel (a) with that of the selected output channel (b) and by calculating the new value of the sum word. The message is thereupon forwarded in the manner already described.

A negative result of comparison indicates the occurrence of a failure which may concern matrix MCE1, transceiver RTBU2 of unit UC1b or the counterpart of transceiver RTBE3' in unit UC8c, or else any of the links between those components.

Moreover, the failure may have affected subsidiary circuitry associated with controller CTR1b, such as samplers CDTE2, CDTU2 and their interconnections.

In all these cases, controller CTR1b forwards the routing message with a suitable function code to upstream controller CTR1a so that the latter may locate a new signal path and isolate the channel reserved for dialogue with controller CTR1b, along with the PCM group physically associated with that channel.

The alarm message intended for controller CTR1a will be forwarded through the connection between the fourth and fifth network stages; the detection of any failure of active constituents of a controller (microprocessor, memories) involves conventional self-diagnostic methods such as parity checks and software traps. In most instances, the source of malfunctions discovered by controller CTR1b will lie within unit UC1b itself, in the transceiver RTBE3' of the immediately following stage or in the intervening connection.

The isolation of a faulty component by upstream controller CTR1a, in response to a failure signalization received from circuit CTR1b, occurs according to preprogrammed procedures and is accompanied by a report to the exchange equipment identifying such component.

The diagnosis method just described can be implemented in several ways. Thus, for example, a connection may be tested immediately after being set up, some or all of the segments of an established signal path can be cyclically checked, or the two kinds of test may be carried out jointly with pre-assigned priority criteria. We generally prefer to give top priority to the most recently completed path segment. The method is also compatible with conventional procedures for overall network supervision, carried out by associated peripheral units.

In attempting to set up a connection, the controller of a stage may be unable to forward the routing message to the next stage because it cannot find a free channel leading thereto; such a situation is termed "blocking". With reference to the example described above, let us suppose that the blocking involves the third stage, i.e. that controller CTR8c (FIG. 1) cannot locate a free channel able to link the fourth stage 4T with channel b of group D1". Controller CTR8c then modifies the routing message for channel b (while leaving its data field unchanged), by inserting a function code relating to route blocking, and transmits the message so modified to the originating controller CTR1b through a dialogue channel available on the link between the third and fourth stages.

After receiving the blocking message relating to channel b of output No. 16 of matrix MCE1, controller CTR1b locates in its memory the routing data relating to the designated output channel. After retrieving routing information (from channel a of group C1' on input No. 1 of matrix MC1 to channel b of group D16 on output No. 16 of matrix MCE1), it disconnects the output channel of matrix MCE1 and reroutes channel a toward a third-stage matrix via a path excluding the link used in the first attempt.

The maximum number of rerouting attempts within a switching plane PC may be preprogrammed. Once this number is exhausted, the blocking message is sent back to the first-stage controller (in this case circuit CTR1a) which had sent out the routing instruction; controller CTR1a will then proceed to reroute the connection through a switching plane other than PC16.

Figure 7:
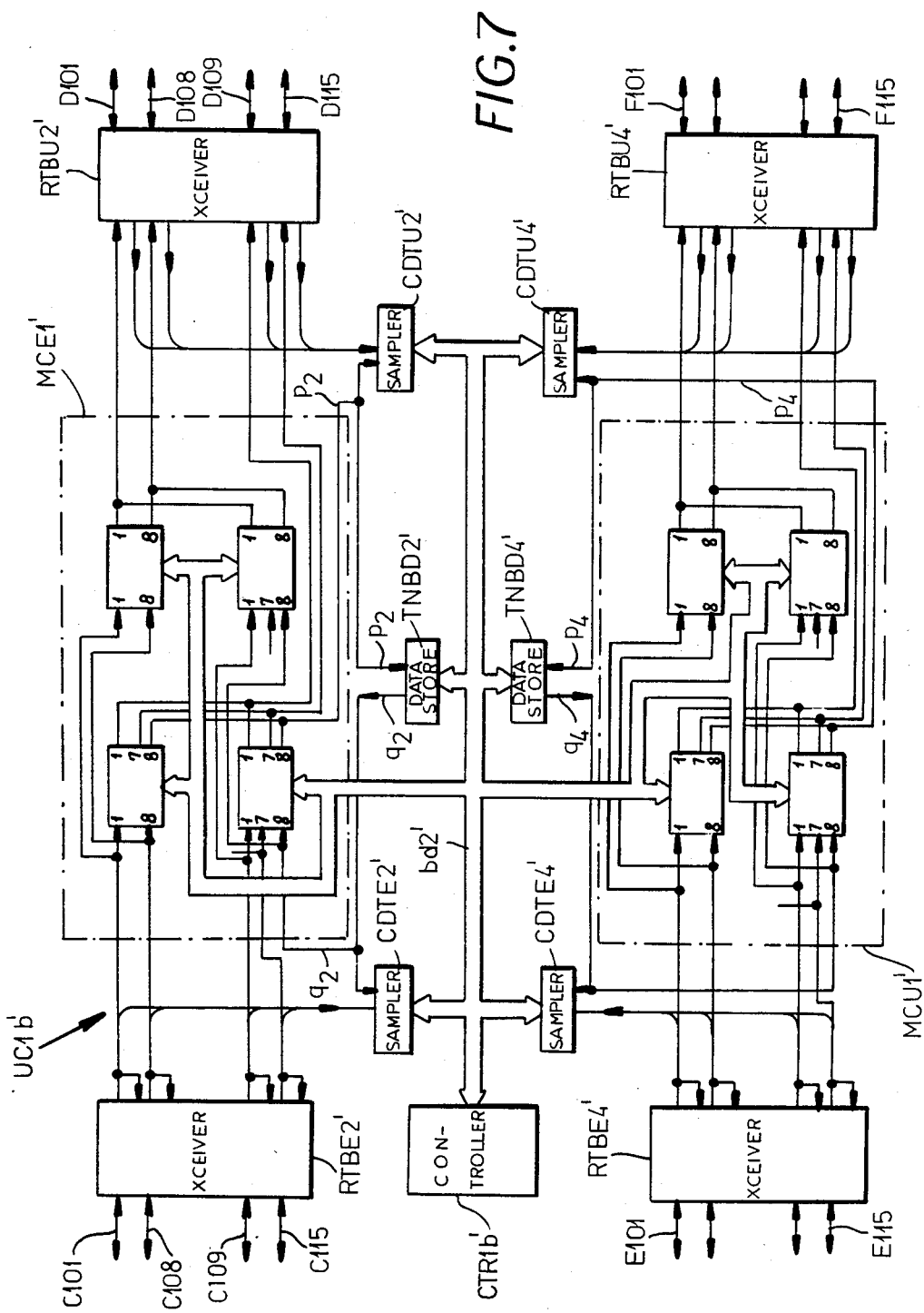
FIG. 7 is a block diagram illustrating a modification of the switching unit shown in FIG. 4.

At the cost of a slight capacity reduction, the structure of the aforedescribed switching units can be simplified by eliminating circuits ITNBD. This possibility is illustrated in FIG. 7 for a switching unit UC1b' assigned to the second and fourth stages of the network. Matrices MCE1' and MCU1' of this unit each have 15 switchable inputs for channel groups C101 ... C115, E101 ... E115 arriving from the first and third stages through upstream transceivers RTBE2', RTBE4'.

A nonswitchable 16th input of each matrix is connected to an output lead $q_2$ or $q_4$ of storage circuits TNBD2' or TNBD4', respectively; these leads are also respectively connected to inputs of extractors CDTE2', CDTE4'.

Each of these matrices further has fifteen switchable outputs for outgoing channel groups D101 ... D115 and F101 ... F115 respective connected to the associated downstream transceivers RTBU2', RTBU4'; a nonswitchable 16th output of each matrix is connected to data store TNBD2' or TNBD4', respectively, by a lead $p_2$ or $p_4$ connected also to the inputs of the corresponding samplers or extractors CDTU2' and CDTU4'.

The serialization and parallelization of the bytes of the dedicated dialogue channels associated with all incoming and outgoing PCM groups of switching unit UC1b'; fed to and received from components TNBD, is in this case carried out by the matrices MCE1' and MCU1' themselves which continuously distribute the bytes of the No. 0 channels of the 15 incoming groups to 15 channels of a 16th group exciting from the nonswitchable outputs thereof on leads $p_2$ and $p_4$; the bytes of the 15 dialogue channels delivered to the nonswitchable 16th input of each matrix by leads $q_2$, $q_4$ are similarly redistributed to the No. 0 channels of the 15 outgoing groups.

The connections between the dialogue channels via matrices MCE1' and MCU1' can be set up by controller CTR1b', during initialization of switching unit UC1b', by sending suitable routing instructions to the switching elements EC of these matrices through bus bd2'. A time base such as that shown in FIG. 6, extracting sync pulses from the incoming bit stream, is of course also needed in this instance to control the interchange of bytes with the 16th PCM group taking the place of the shift registers SR2-SR16. The operation of unit UC1b' is otherwise analogous to that described for switching unit UC1b of FIG. 4.

Switching units UC1a and UCLc can be modified in a manner analogous to that just described; in particular, unit UC1a will then encompass two rectangular matrices, one with 7 inputs and 15 outputs, and the other with 15 inputs and 7 outputs.

Apart from the channels dedicated to intercontroller dialogue, the simplified switching unit UC1b' has a reduced capacity of 930 available PCM channels (30 groups of 31 incoming/outgoing channels).

The simplification of the modular switching units described with reference to FIG. 7 reduces, of course, the overall capacity of a network incorporating same. Thus, for example, the use of such a simplified structure in every stage of the network of FIG. 1 will provide a capacity of 55,552 PCM channels instead of 63,488 channels as in the network whose boards include components ITNBD.

The preceding description clearly shows the advantages which our invention affords over prior-art systems in terms of modularity, flexibility of utilization, distribution of functions and quality of performance.

In particular, the present invention makes it possible to provide network structures which have capacities ranging from a few hundred to several hundred thousand PCM channels with a number of temporal stages ranging fron one (network consisting of a single $8 \times 8$ or $16 \times 16$ matrix) to seven, using a single type of basic module. A three-stage network, for example, may consist of a single switching plane with a capacity of 8,192 channels. With a given number of stages, the capacity may be varied not only by substituting the simplified switching units discussed above but also by changing the number of matrices and their connections. Halving the number of matrices in a switching plane and connecting the two sets of output lines of a matrix MCE to the two sets of input lines of a matrix MCC yields switching planes of 4,096 channels; a five-stage network with 32 central planes can be obtained by using matrices ME with 16 input lines and 32 output lines, and matrices MU with 32 input lines and 16 output lines. In any case, high efficiency is always maintained in the ratio between hardware employed and the number of channels served.

A seven-stage network is also possible, though problems of transit delays and routing times may make its use less desirable. In this case, the folded switching units would respectively combine matrices of the first and seventh stages, of the second and sixth stages and of the third and fifth stages; the fourth-stage switching unit would remain unfolded.

Furthermore, the network can adapt itself easily to technological developments in its integrated constituents and provides a considerable distribution of control so as to optimize the ratio between installed processing power with a given equipment configuration and the number of channels served.

The presence of a local controller on each individual switching unit makes the network truly self-routing in that the connection of a PCM channel within the network is selected independently by the controller of the switching unit involved in each stage. In this way, the peripheral exchange controllers are completely relieved of the task of locating a signal path through the network. The use of special integrated circuits for dialogue among switching-unit controllers relieves the microprocessor of dialogue handling and affords shortened actuation times whereby a large number of connection requests can be expeditiously accommodated.

Moreover, such circuits are compatible with standard PCM systems; network components may thus be of general-purpose type and interface circuits for format conversion are unnecessary.

The blocking characteristics of the network are such as to ensure negligible losses in any operating condition for the maximum envisaged traffic levels; thanks to the use of controllers distributed among the switching units, the network can automatically find alternative routing paths in the event of blocking or internal failure without depending on the intervention of peripheral control units.

Transit delay on the PCM channels established by the network is minimized by strategies individually implemented by each switching-unit controller; the use of specialized ancillary circuits for diagnosis makes it possible to extend the functions of verification, failure localization and reconfiguration to the level of the individual structural units and thus cover failures involving the links between the basic modules making up the network.

A switching unit of the type herein disclosed, equipped with a controller and ancillary diagnostic circuitry, is capable of performing autodiagnosis and configuration-identification procedures, thus relieving the supervisory organs in the exchange of the heavy burdens imposed by these tasks.

With the utilization of microprocessors for the local controllers, the use of different operating programs for the controllers of each unit and suitable selection of the number and structure of central switching planes PC, we can choose the optimum compromise regarding actuation times, blocking probability, diagnosis and network cost, and thus cover the entire range of possible telephone-switching applications (transit, urban, local or mixed exchanges). For example, network structures with a limited number k of internal planes enable a reduction in the number of switching units employed and hence of cost; however, a larger number of possible routing attempts must then be allowed in light of the higher blocking probability. This strategy will obviously give rise to longer actuation times in the switching network. On the other hand, with a larger number of planes we can reduce the number of routing attempts since the blocking probability is intrinsically low in that case; short actuation times are thus possible.

Moreover, with a given equipment configuration, it is possible to modify the controller programs to provide a network with a sophisticated diagnostic facility at the expense of actuation speed or, conversely, a network with less elaborate diagnostic capabilities but designed to execute commands from the peripheral organs more quickly, as could be required if the exchange must handle new services (e.g. data transmission).

Reference is further made to another commonly owned application, Ser. No. 478,467 filed on even date herewith by two of us (Piero Belforte and Luciano Pilati) jointly with Enzo Garetti, showing a generally similar switching network.

We claim:

1. In an automatic exchange of a telecommunication system, in combination:
 a switching network divided into a plurality of cascaded time division stages each containing at least one switching matrix, including a first stage with input lines adapted to carry data words pertaining to respective groups of incoming PCM channels, interstage lines adapted to carry data words pertaining exclusively to respective groups of PCM channels and a last stage with output lines adapted to carry data words pertaining exclusively to respective groups of outgoing PCM channels;
 external control means for commanding the establishment and disestablishment exclusively of temporal signal paths for the transmission of data words of incoming channels from any of said input lines to any of said output lines as part of selected outgoing channels, each PCM channel having a time slot assigned thereto in a recurrent frame marked by accompanying synchronization pulses; and
 internal control means responsive to commands from said external control means for selectively setting up and selectively releasing said signal paths via a matrix of each stage, said internal control means including a plurality of network controllers associated with respective matrices and arranged to communicate with one another and with said external control means by routing instructions transmitted in dedicated channels of respective groups to and from said network controllers through inputs and outputs of the associated matrices, whereby each of said network controllers solely determine the routing paths within each of said stages of said switching network.

2. The combination defined in claim 1 wherein said internal control means further comprises a plurality of data stores inserted between said network controllers and respective matrices associated therewith, said data stores communicating with said network controllers asynchronously and with said matrices at a frequency related to that of said time slots.

3. The combination defined in claim 2 wherein the number of said stages is odd, a pair of matrices of nonadjoining stages being combined in a modular unit, a network controller common to said pair of matrices being included in said unit along with two of said data stores respectively inserted between said pair of matrices and said common network controller.

4. The combination defined in claim 2, further comprising timing means responsive to said synchronization pulses for serializing data words of incoming routing instructions arriving simultaneously at respective matrix inputs in a predetermined time slot assigned to said dedicated channels, each of said data stores receiving the serialized data words from the respective matrix input and being controlled by said timing means to emit data words of outgoing routing instructions during said predetermined time slot to respective matrix outputs carrying channel groups to which the stored routing instructions pertain.

5. The combination defined in claim 4 wherein at least one of said matrices has a nonswitchable input, a nonswitchable output and a multiplicity of switchable inputs and outputs, said nonswitchable output being connected to an input of the associated data stored for supplying same with serialized data words from said switchable inputs, said nonswitchable input being connected to an output of the associated data store for serially reading out data words therefrom and concurrently distributing same to said switchable outputs in said predetermined time slot.

6. The combination defined in claim 4 wherein said internal control means further comprises converters respectively inserted between said data stores and the associated matrices, said converters being controlled by said timing means for serializing incoming data words present at the matrix inputs during said predetermined time slot and parallelizing stored data words emitting during said predetermined time slot to the matrix outputs.

7. The combination defined in claim 6 wherein each of said converters comprises a multiplicity of shift registers jointly loadable in said predetermined time slot with incoming data words from respective matrix inputs and consecutively loadable in further time slots of a frame with stored data words to be emitted to respective matrix outputs, first multiplexer means responsive to signals from said timing means for controlling the loading of said shift registers, and second multiplexer means responsive to signals from said timing means for controlling the unloading of said shift registers with sequential readout of the incoming data words to said data store and with concurrent readout of the stored data words to said matrix outputs.

8. The combination defined in claim 7 wherein said predetermined time slot is the first time slot of a frame, said second multiplexer means directly conveying to said data store a data word appearing on one of said matrix inputs during said first time slot.

9. The combination defined in claim 8 wherein the number of said shift registers is one less than half the number of time slots per frame, said first and second multiplexer means being controlled by said timing means to establish communication between said data store and respective shift registers during every other time slot following said first time slot.

10. The combination defined in claim 1, further comprising a pair of samplers connected to signal lines at locations upstream and downstream of each of said matrix for extracting data words entering and leaving the respective matrix in an established signal path at instants separated by the transit time between said locations, said samplers being connected to the network controller associated with said respective matrix for enabling a comparison of the extracted data words by said network controller to verify the continuity of the established signal path, whereby if there is a failure to verify, said network controller does not set up said signal path and said network controller further initiates diagnoses of said failure to verify.

11. The combination defined in claim 10 wherein each matrix is inserted between an upstream transceiver and a downstream transceiver, one of said locations lying between said upstream transceiver and the inputs of the respective matrix, the other of said locations lying within said downstream transceiver.

* * * * *